March 4, 1969  G. A. PERSSON ET AL  3,430,739
RAILWAY VEHICLE BRAKE RIGGING

Filed Aug. 18, 1967  Sheet 1 of 2

INVENTORS
NILS B.L. SANDER
GERT A. PERSSON

BY Laurence R. Brown
ATTORNEY

_United States Patent Office_

3,430,739
Patented Mar. 4, 1969

3,430,739
RAILWAY VEHICLE BRAKE RIGGING
Gert Artur Presson, Oxie, Sweden, and Nils Börje Lennart Sander, Malmo, Sweden, assignors to Svenska Aktiebolaget Bromsregulator, Malmo, Sweden, a corporation of Sweden
Filed Aug. 18, 1967, Ser. No. 661,690
Claims priority, application Great Britain, Apr. 18, 1967, 17,630/67
U.S. Cl. 188—202                  12 Claims
Int. Cl. F16d 65/56; B60t 11/10

ABSTRACT OF THE DISCLOSURE

A railway brake system with a compact brake rigging affixed to a housing on the vehicle is disclosed including bidirectional slack adjusting means relatively movable with respect to the housing. The slack adjusting means comprises an axially displaced push transmitter receiving a compression force and having a threaded spindle and a locking nut thereon affixed in a relatively positionable telescoping sleeve with means for adjusting the relative position by rotating the nut in either direct to hold a predetermined degree of slack. In order to reduce the space in which the brake rigging is mounted, the entire slack adjusting linkage assembly pivots on respective levers about an arc defined by two fixed pivot points on the fixed housing, and intervenes between a brake power cylinder and the movable braking assembly to permit a compression force to be transmitted therethrough. A series of springs and clutches coact to cause the nut to rotate in the proper direction when brakes are actuated to compensate and correct the slack in the brake linkage whenever slack becomes too great from wear or too little when new brakeshoes are installed. One such spring holds the telescoping parts in tension and coacts with the compressive braking force to aid in determining the position during application of the brakes that the slack take up and let out operations occur.

---

_Specification_

Figure 1:
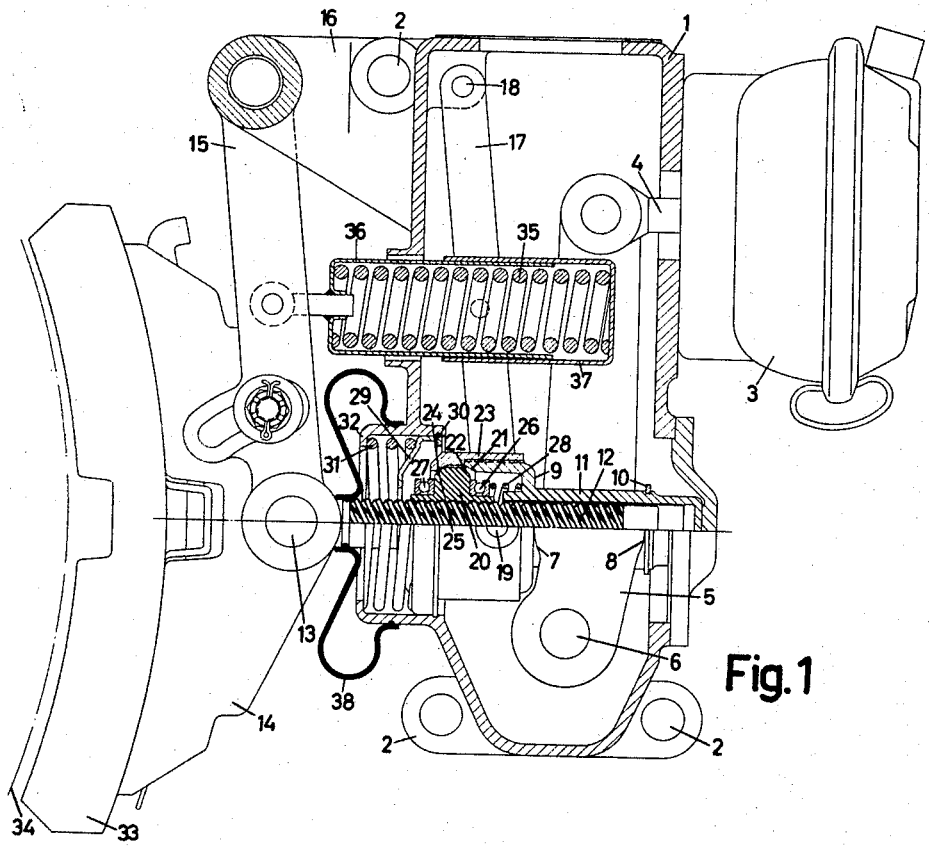

This invention relates to a railway vehicle brake rigging of the kind comprising a bidirectional slack adjuster within a housing for actuation by a power cylinder rigidly secured to said housing.

Brake riggings of the kind referred to are often referred to as "compact brake riggings" or "brake units," and they are frequently used on vehicles in which the space available for the rigging is very restricted. Hitherto such compact riggings have either been provided with manual slack adjusters or with slack adjusters which are automatic only in the direction for reducing the slack. United States Patent 2,767,811 is representative of noncompact bidirectional slack adjusters. Formerly known bidirectional slack adjusters are not adaptable to compact bidirectional action because they have not been affixed to the vehicle housing for movement relative thereto and because of operation in a tension rather than compression mode, and have sometimes introduced large and undesirable variations in braking forces as loads vary and as brakes wear.

An object of the present invention is to provide a brake rigging of the kind referred to but including a double-acting and rapid-acting automatic slack adjuster providing improved performance over prior art devices.

A further object is to provide such a compact rigging requiring such little space that the greater part thereof may be mounted within the interior of the bolster of a railway bogie.

A still further object is to provide a brake rigging which may be completely installed in the separate bolster prior to the assembling of the bogie or of the entire vehicle.

According to the present invention, a brake rigging of the kind referred to has a pair of levers pivotally mounted in said housing and connected to a slack adjuster or push transmitter to pivot it through an arc, wherein a spring force source is inserted between the two levers for establishing a tension force between two relatively positioned push transmitter parts locked in place by locking means, and including means for disengaging said locking means in response to variations from a predetermined amount of slack in the brake rigging, and means adjusting the degree of slack as the brakes are applied.

The adjustment is accomplished when two telescoping members move relative to a fixed housing under direction of a compressional braking force and against the force of a loading spring tending to hold them apart in tension. The rotatable nut is freed during an intermediate travel range when the braking force overcomes the loading spring tension, but the nut is locked in place at each end of the range. In one embodiment, a slack take up adjusting spring is held at both ends within the housing and is engaged by the nut after a predetermined axial travel of the spindle by means of the braking force, so that the nut can be rotated by the slack take up adjusting spring only during a portion of the movement in the intermediate travel range when the nut is exposed to a force from the slack take up adjusting spring which is slightly greater than the force of the loading spring tending to hold the two telescoping members apart.

Further and optional features of the invention appear from the following description and are set forth in the appended claims.

Figure 2:
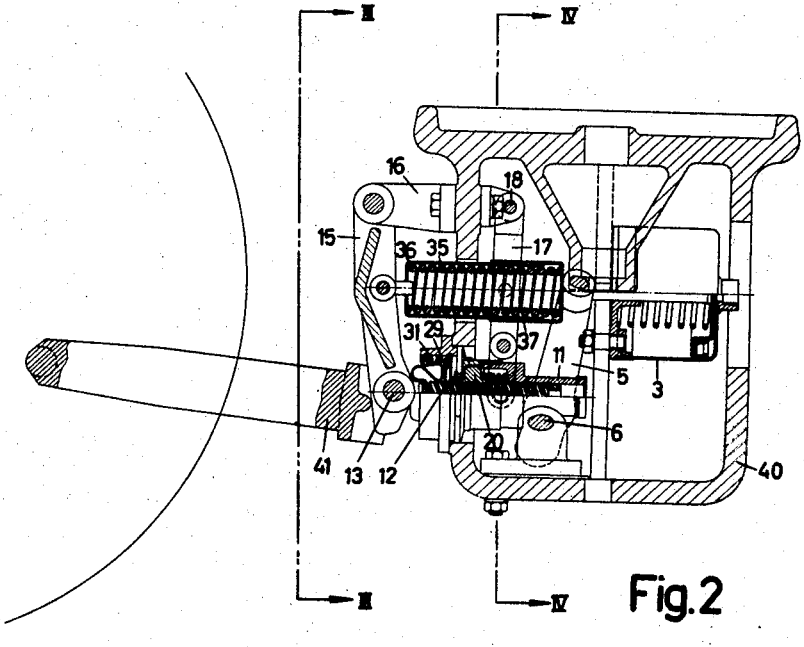
Figure 3:
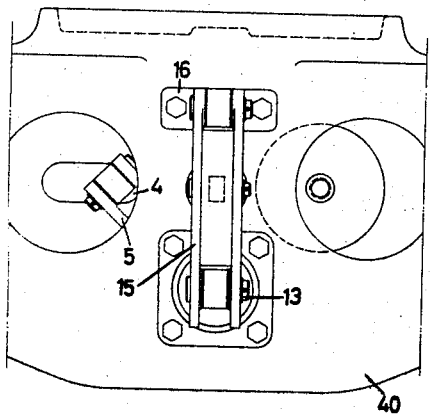
Figure 4:
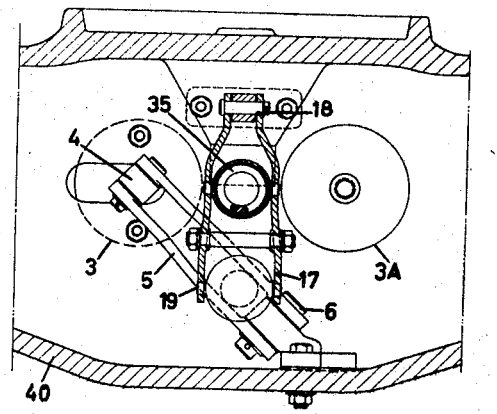

The invention is further described with reference to and illustrated by way of example in the accompanying drawings, in which:

FIGURE 1 is a view partly in vertical section of a first brake rigging according to the invention, FIGURE 2 is a view partly in vertical section of another brake rigging according to the invention, FIGURE 3 is a view in section along the line III—III in FIGURE 2, and FIGURE 4 is a view in section along the line IV—IV in FIGURE 2.

Referring to the drawings, FIGURE 1 represents a brake rigging comprising a housing 1 provided with lugs having holes 2 adapted to receive fastening bolts (not shown) for securing the housing 1 to a suitable part of a vehicle (not shown). Secured to the housing 1 is a cylinder 3 accommodating a piston having a piston rod 4 which is pivotally connected to a first lever 5 which is pivotally connected at 6 to the housing 1. The lever 5 is provided with arcuate surfaces 7 and 8 adapted to engage respectively a surface 9 of a flange and a surface 10 of a spring ring clip on a sleeve 11. A screw-threaded spindle 12 is partially accommodated telescopically in the sleeve 11. The screw-threaded spindle 12 is pivotally connected at 13 to a brake shoe 14 and to a second lever 15 which is pivotally connected to a bracket 16 integral with the housing 1. A third lever 17 is pivotally connected at 18 to the housing 1 and at 19 to the sleeve 11.

The spindle 12 carries a nut 20, the threads on the spindle 12 and the nut 20 meshing and having such pitch as to be nonself-locking. In FIGURE 1, the left-hand end of the sleeve 11 is formed with a forwardly directed clutch surface 21 adapted to engage a corresponding rearwardly directed clutch surface 22 on the nut 20. However, there is a small gap between said clutch surfaces 21 and 22 when the parts are in the released brake position as shown in FIGURE 1.

Rigidly secured to the sleeve 11 is a collar 23 provided with an inwardly directed annular flange part having a rearwardly directed clutch surface 24 adapted to engage a forwardly directed clutch surface 25 on the nut 20. The nut 20 also carries two low-friction axial thrust bearings, one being a rear ball-bearing 26 and the other a front ball-bearing 27. A compression spring 28 is held between and bears against said rear ball-bearing 26 and a shoulder surface on the sleeve 11.

A flanged ring 29 is axially movable in a part of the housing 1 and is urged towards an abutment therein in the form of a spring ring clip 30 by a compression spring 31, the front end of which bears against an annular flange part 32 of the housing 1. The flanged ring 29 is adapted to engage the front assembly including ball-bearing 27 after a forwardly directed travel of the nut 20 with the spindle 12 and sleeve 11.

The brake shoe 14 carries a brake block 33 adapted to engage the rim 34 of a vehicle wheel indicated by a dash-dotted line.

A strong compression spring 35 bears against two telescopically displaceable sleeve parts 36 and 37 pivotally secured to the second lever 15 and third lever 17, respectively. The strong spring 35 tends to push the levers 15 and 17 away from each other, but in the released brake condition as illustrated this action is limited by the engagement of the clutch surfaces 24 and 25. The forward force of the spring 35 is transmitted through the sleeve 36, second lever 15, pivot 13, and spindle 12 to the nut 20 having the clutch surface 25. The rearward force of the spring 35 is transmitted through the sleeve 37, third lever 17, pivot 19, and sleeve 11 to the collar 23 having the clutch surface 24 which is engaged by the clutch surface 25.

The sleeve 11 and spindle 12 may perform a swinging movement defined by the second and third levers 15 and 17.

The entrance of water and dust into the interior of the housing 1 is prevented by a rubber covering sleeve 38.

The brake rigging as described above with reference to and as viewed in FIGURE 1 will function as follows:

When compressed air is fed to the cylinder 3, the piston rod 4 will be expelled and turn the first lever 5 in counterclockwise direction. Such turning of the lever 5 will cause a movement of the sleeve 11 towards the left—in the forward direction—the said movement being transmitted by engaegement of the surfaces 7 and 9.

Initially, the slack being normal and the braking force being low, the braking force is transmitted from the piston rod 4 through the first lever 5, the surfaces 7 and 9, the sleeve 11 and pivot 19, the third lever 17, the sleeve 37, the strong spring 35, the sleeve 36, the second lever 15, and the pivot 13 to the brake shoe 14 carrying the brake block 33.

After the brake block 33 engages the wheel rim 34 and as the braking force increases the strong spring 35 becomes more compressed, the pivot 19 approaches the pivot 13, the clutch surface 24 separates from the clutch surface 25, the clutch surface 21 approaches the clutch surface 22, and the front ball-bearing 27 on the nut 20 approaches the flanged ring 29.

After a further increase of braking force and further compression of the spring 35 the clutch surface 21 engages the clutch surface 22, and braking force is transmitted as initially and also from the piston rod 4 through the first lever 5, the surfaces 7 and 9, the sleeve 11, clutch surfaces 21 and 22, the nut 20, the spindle 12, and the pivot 13 to the brake shoe 14.

While the brake block 33 is approaching the wheel rim 34 the front ball-bearing 27 on the nut 20 is approaching the flanged ring 29, and if there is normal slack between the brake block 33 and the wheel rim 34, the ball-bearing 27 will engage the ring 29 after the engagement between the brake block 33 and the wheel rim 34 and at the moment when the braking force transmitted is such that force is no longer transmitted between the clutch surfaces 24 and 25 from the strong spring 35. As the braking force increases and the spring 35 becomes more compressed as mentioned above, there is a further travel in the forward direction of the sleeve 11, and this will cause an opening of the clutch surfaces 24 and 25 and an engagement of the clutch surfaces 21 and 22.

A further forward travel of the spindle 12 and the sleeve 11 will cause a compression of the spring 31 and a forward travel of the flanged ring 29. However, the engagement between the clutch surfaces 21 and 22 will prevent any rotation of the nut 20.

During the following release of the brakes the spindle 12, the sleeve 11, and the nut 20 will move rearwardly while the spring 31 will expand. However, the brake force transmitted is still above the force exerted by the spring 35 between the sleeve 11 and the spindle 12. Therefore, no rotation of the nut will take place as the clutch surfaces 21, 22 are still engaged. As soon as the sleeve 29 has reached the spring ring clip 30 the brake force transmitted will have decreased to a value corresponding to the force of the spring 35. Upon further movement rearwardly the clutch surfaces 21, 22 will disengage and the clutch surfaces 24, 25 will engage. Thus, when there is normal slack, there is no relative axial displacement of the nut 20 on the spindle 12 resulting from an application and subsequent release of the brake.

If the brake is applied when the slack between the brake block 33 and the wheel rim 34 has become too large—for example because of wear—the ball-bearing 27 will contact the ring 29 prior to the transmission of such braking force that the clutch surfaces 24 and 25 separate and the clutch surfaces 21 and 22 engage. As soon as the resistance offered by the ring 29 against the forward movement of the ball-bearing 27 exceeds the force between the clutch surfaces 24, 25, the said surfaces 24, 25 will disengage and the ring 29 will urge the ball-bearing 27 and nut 20 rearwardly, the nut 20 rotating on the spindle 12 until the spindle 12 has been expelled so much that the brake block 33 engages the wheel 34. The clutch surfaces 21 and 22 will then engage. Preferably, the force of the prestressed spring 31 is greater than the force transmitted between the clutch surfaces 24, 25 when no braking force is exerted, and thus the take up adjustment will be completed without any compression of the spring 31. This permits full slack take up by rotation of nut 20 before the braking forces start compressing spring 31.

During the expelling of the spindle 12 the spring 31 will expand until the ring 29 again engages the spring ring clip 30. After the engagement of the brake block 33 against the wheel 34 and after the engagement of the surfaces 21 and 22, the spindle 12 may be further expelled while the braking force is rising to its final value, the movement of said spindle being caused by elastic deformation in the brake rigging and the vehicle. During this final stage of the braking the spring 31 will be compressed and offer a comparatively slight resistance against the brake application.

During the following release of the brakes the braking force will decrease while the spring 31 will expand. As soon as the ring 29 contacts the spring ring clip 30 the braking force will have reached the value of the force transmitted by the spring 35. The clutch surfaces 21, 22 will now be disengaged and the surfaces 24, 25 will engage. Thus, there has been an axial displacement of the nut 20 on the spindle 12, in consequence of which there is also a relative displacement of the sleeve 11 and the spindle 12 axially through the distance between the brake block and the wheel at the time when the brake force reached the value of the force between the sleeve 11 and the spindle 12 exerted by the spring 35 during the application of the brake. The distance between the pivots 13 and 19 has been correspondingly increased, and the slack has thus been restored to the desired value.

If the slack between the brake block 33 and the wheel rim 34 has become too small—for example because of replacement of the brake block—the ball-bearing 27 will not contact the ring 29 at the moment the transmitted braking force corresponds to that caused only by the force emerging from the spring 35 and being transmitted via the clutch surfaces 24 and 25. As soon as the force derived from the cylinder 3 and transmitted between the sleeve 11 and spindle 12 is sufficient to balance the force derived from the spring 35 and transmitted at the clutch surfaces 24 and 25, said clutch surfaces 24 and 25 will be opened and the spindle 12 will be drawn rearwards towards the right in FIGURE 1 while the nut 20 is rotating on the spindle 12 and while the spring 35 is being compressed. This will continue until the ball-bearing 27 engages the ring 29 and the clutch surfaces 21 and 22 are engaged. The normal slack has now been restored, the distance between the pivots 13 and 19 having been decreased by an amount corresponding to the relative axial displacement of the spindle 12 and the sleeve 11.

FIGURES 2, 3 and 4 show one of a pair of brake riggings according to the invention incorporated with a bolster 40 of a bogie and arranged for activating brake beams 41—one at each side of the bolster 40. Each brake beam 41 is activated by a separate brake rigging having its own cylinder and slack adjusting device.

In the following only one of the two riggings of a pair on a bogie will be explained.

In FIGURES 2, 3 and 4 the bolster 40 also fulfills the functions of the housing 1 shown in FIGURE 1. The brake beam 41 is engaged (instead of the brake shoe 14 shown in FIGURE 1) by the second lever 15. This permits engagement at a lever linkage position which varies as loading of the bogie changes and bolster 40 moves back and forth vertically (as shown). As the load is increased, this moves bolster 40 downward and advantageously applies greater braking force to brake beam 41. Otherwise most details in this brake rigging are generally similar in appearance as corresponding parts described in connection with FIGURE 1 and have been given the corresponding reference numerals. Thus, the sleeve 11 and spindle 12 have been mounted in the middle of the bolster 40 in a vertical plane of symmetry. The second lever 15 and the third lever 17 are also mounted in the same plane of symmetry, but the first lever 5 is mounted inclined as shown in FIGURE 4 and the brake cylinder 3 is mounted wholly outside the middle of the bolster 40 in order to allow the mounting of a corresponding brake cylinder 3A shown in FIGURE 4 and belonging to the other brake rigging which is otherwise not shown or described.

As will be understood from FIGURES 2, 3 and 4, a substantial part of the brake rigging is mounted wholly inside the bolster 40 which also serves as a protecting housing to which the brake cylinder 3 is rigidly secured.

Thus, in each of the illustrated brake riggings there is a housing and a cylinder 3 rigidly secured to the housing, and a first lever 5 pivotally mounted in the housing and pivotally connected to a piston movably arranged in said cylinder 3. The sleeve 11 and spindle 12 constitute respectively the first and second parts of an axially displaceable push transmitter mounted in said housing, these parts being telescopically relatively displaceable and their relative axial position being determined by locking means including the nut 20. The first one of said parts, i.e., the sleeve 11, is provided with means in the form of the surface 9 for axial engagement with the first lever 5. A second lever 15 is pivotally mounted on said housing and is pivotally connected to the second one of said push transmitter parts, i.e., the spindle 12. A spring force source, i.e., the precompressed strong spring 35, is inserted between the said second lever 15 and the said first one of said push transmitter parts, i.e., the sleeve 11, for establishing a tension force between said first and second push transmitter parts, i.e., the sleeve 11 and the spindle 12. There are means, including the ring 29, for disengaging said locking means at least after a predetermined maximum axial travel of said push transmitter.

Having therefore illustrated in the foregoing embodiments the invention and its operation, those features of novelty believed descriptive of the nature and spirit of the invention are defined with particularity in the appended claims.

What is claimed is:

1. A railway vehicle brake rigging comprising in combination, a housing affixed to said vehicle, a power cylinder rigidly secured to said housing and including a piston movably arranged in said cylinder, a first lever pivotally mounted in the housing and pivotally connected to said piston in said cylinder, an axially displaceable push transmitter mounted for movement relative to said housing and having first and second telescopically relatively displaceable transmitter parts, the relative axial position of which transmitter parts is determined by locking means, the first one of said push transmitter parts being provided with means for axial engagement with said first lever for receiving and transmitting a compression braking force to the vehicle brakes supplied by said power cylinder, a second lever pivotally mounted on said housing and pivotally connected to the second one of said push transmitter parts, a spring force source being inserted between the said second lever and the said first one of said push transmitter parts for establishing a tension force between said first and second push transmitter parts, means for disengaging said locking means in response to variations from a predetermined amount of slack in the brake rigging, and means operable when the locking means is disengaged to adjust the relative displacement of said first and second parts to establish said predetermined amount of slack.

2. A combination as defined in claim 1, wherein the means for disengaging said locking means includes means secured to one said telescoping member for contacting the locking means after axial travel of said push transmitter effected by said braking force to thereby disengage said locking means responsive to the condition that the braking force is at least equal to the spring tension force between the two push transmitter parts provided by said spring force source.

3. A brake rigging according to claim 1, wherein the spring force source consists of a compression spring with two ends abutting spring supports, a first of which is connected to said lever, a third lever with one end pivotally connected to the housing the other end pivotally connected to the first one of the push transmitter parts and comprising one of the spring supports engaging the second of the two ends of said spring.

4. A brake rigging according to claim 1, wherein said second push transmitter part is a screw-threaded spindle carrying a nut, the threads being of such pitch as to be nonself-locking and having opposite clutch surfaces on either side and having a low friction axial thrust bearing on at least one end, the said first push transmitter part is a sleeve and partly surrounding said spindle, the said sleeve carrying inwardly directed shoulder parts having clutch surfaces rearwardly and forwardly engageable with corresponding clutch surfaces at the forward and rear end of said nut upon small axial displacement of said nut, and a compression spring is held between and bears against said bearing on the rear end surface of said nut and a forward surface of said sleeve.

5. A brake rigging according to claim 4, comprising a collar rigidly secured to said sleeve and provided with said inwardly directed shoulder parts.

6. A brake rigging according to claim 4, comprising a flanged ring axially movable in a part of the housing and spring-loaded towards an abutment therein, the flanged ring being adapted to engage one of said low-friction axial thrust bearings at the front of said nut after a forward movement of said nut.

7. A brake rigging according to claim 1, wherein said second push transmitter part is connected to move a brake shoe carrying a brake block adapted to engage the rim of a vehicle wheel.

8. A brake rigging according to claim 1, wherein said housing is constituted by a bolster in a vehicle bogie, the said cylinder and said first lever being mounted within the bolster, and said second lever is mounted on the outside of the bolster and is adapted to directly engage a brake beam.

9. A brake rigging according to claim 8, wherein the levers include a linkage increasing the braking pressure as the load on the bogie increases.

10. Apparatus for adjusting slack bidirectionally in a railway vehicle brake rigging comprising in combination, a housing affixed to the vehicle, two telescoping members relatively axially movable with respect to said housing including a threaded rod, a freely movable nut positioned about the threads on the rod, means in one telescoping member locking the nut in place at each end of a range of movement of the two telescoping members and freeing it for rotation on the threaded rod intermediate the range, means applying a compressional braking force through the telescoping members to the vehicle brake, loading spring means affixed to at least one telescoping member tending to hold the telescoping members apart in tension against said braking force, and means operable in said intermediate range of movement where said nut is freed to rotate the nut respectively in opposite directions under the conditions that brakes are applied when too much or too little slack exists in the linkage including a member on said fixed housing, a slack adjusting spring held in preloaded condition at both ends within the fixed housing member and means including said nut engaging the slack adjusting spring at one end to tend to compress it against the fixed housing member during axial travel of the threaded rod by the braking force, whereby the slack adjusting spring force overcomes the force of the loading spring and permits rotation of said nut during said intermediate range to reduce slack.

11. Apparatus as defined in claim 10, wherein the slack adjusting spring is stronger than the force applied by the loading spring, whereby the slack adjusting spring is compressed only by braking forces occurring after slack is reduced.

12. A brake rigging comprising an axially displaceable push transmitter having first and second telescopically relatively displaceable transmitter parts, the first one of said push transmitter parts being provided with means for axial engagement with a power source and the second of said push transmitter parts being provided with means for moving a brake, selectable locking means holding the first and second parts in relatively fixed position, a pair of pivoted levers coupled to each of the first and second parts respectively to swing the push transmitter through an arc, and a spring forcing the pair of levers apart to establish a tension force between the two parts.

References Cited

UNITED STATES PATENTS

| 2,118,236 | 5/1938 | Schwentler | 188—153 |
| 3,280,945 | 10/1966 | Spalding | 188—202 |

DUANE A. REGER, *Primary Examiner.*

U.S. Cl. X.R.

188—153